(12) United States Patent
Ogawa et al.

(10) Patent No.: US 6,340,737 B2
(45) Date of Patent: Jan. 22, 2002

(54) POLYCARBONATE RESIN AND OPTICAL ARTICLE USED THE SAME

(75) Inventors: Noriyoshi Ogawa; Tatsuya Kanagawa; Hidekazu Nakatani, all of Osaka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/819,614

(22) Filed: Mar. 29, 2001

(30) Foreign Application Priority Data

Mar. 29, 2000 (JP) ............................................ 12-090094
Dec. 18, 2000 (JP) ............................................ 12-383918

(51) Int. Cl.$^7$ .............................................. C08G 64/00
(52) U.S. Cl. ........................................ 528/196; 528/198
(58) Field of Search .................................. 528/196, 198

(56) References Cited

FOREIGN PATENT DOCUMENTS

| JP | 60-215029 | 10/1985 | ........... C08G/63/62 |
|----|-----------|---------|------------------------|
| JP | 62-181115 | 8/1987  | ........... B29C/45/00 |
| JP | 3-106931  | 5/1991  | ........... C08G/64/18 |
| JP | 8-134199  | 5/1996  | ........... C08G/64/06 |

OTHER PUBLICATIONS

English Abstract of JP 60–215029 filed Oct. 28, 1985.
English Abstract of JP 62–181115 filed Aug. 8, 1987.
English Abstract of JP 8–134199 filed May 28, 1996.
English Abstract of JP 3–106931 filed May 7, 1991.

*Primary Examiner*—Terressa M. Boykin
(74) *Attorney, Agent, or Firm*—Sughrue Mion, PLLC

(57) ABSTRACT

A polycarbonate resin obtained by reaction of (A) a bisphenol compound having a fluorene structure, (B) a bisphenol compound having a polysiloxane structure, (C) other specific bisphenol compound and a carbonic acid ester-forming compound, wherein an amount of (A) bisphenol compound is 30 to 80% by weight to total amount of (A) bisphenol compound and (B) bisphenol compound, and an amount of (C) bisphenol compound is 1 to 80% by weight to total amount of (A) bisphenol compound, (B) bisphenol compound and (C) bisphenol compound, and an intrinsic viscosity of said polycarbonate resin is 0.2 to 1.0 dl/g.

13 Claims, No Drawings

POLYCARBONATE RESIN AND OPTICAL ARTICLE USED THE SAME

BACKGROUND OF THE INVENTION

1) Field on the Invention

The present invention relates to a polycarbonate resin with a remarkably reduced oblique incidence birefringence, excellent moldability, excellent transcription and good transparency and an optical article used the same. The polycarbonate resin is applicable to uses of general molding of various materials such as medical instrument parts, food vessels, drinking bottles, photoreceptors for electrophotography, toner transfer belts, binders for dye and pigment, gas permeation membranes, toys, materials for window and building, safeguarding materials, OA apparatuses and portable telephones and boxes, and particularly, suitable to the production of optical articles such as optical discs including compact disc, laser disc, optical card, MO disc, digital versatile disc and near field recording optical disc, optical lenses including pick-up lens, spectacle lens and camera lens, optical films and optical sheets including cover layer for near field recording medium and optical filter, optical information transmission media including optical fiber and optical waveguide and photoconductive boards.

2) Prior Art

Recently, a bisphenol A type polycarbonate resin has been widely used as optical materials such as optical disc materials by utilizing its transparency, heat resistance, hydrolysis resistance and dimension stability. However, use of a polycarbonate resin as optical materials caused some problems. Among performances as optical materials, birefringence to change properties of incidence light caused the most important problem.

In order to reduce birefringence, various polycarbonate resin materials have been developed (Japanese Patent Kokai (Laid Open) Nos. 60-215020 and 62-181115). However, also in these developments, reduction of birefringence was not sufficient. Further, recently, reduction of oblique incidence birefringence whose improvement is difficult by controlling molding conditions has been required.

On the other hand, optical disc materials containing polyorganosiloxane have been developed (Japanese Patent Kokai (Laid Open) No. 3-106931). However, in these materials, when the polyorganosiloxane content is increased, transparency to be required for an optical disc could not be maintained, Thus, satisfactory reduction of birefringence could not be attained because the polyorganosiloxane content could not be increased.

Further, in the blend of some resins different in refractive index from each other, white turbidity occurred since it was difficult to disperse uniformly them, so that there occurred problems that use of replaced article in production of other sorts was limited and recycling was difficult.

SUMMARY OF THE INVENTION

An object of the present invention is to provide a polycarbonate resin with a remarkably reduced oblique incidence birefringence, excellent moldability, excellent transcription and good transparency and an optical article used the same.

As a result of extensive studies to solve above-mentioned prior art problems, the inventors have found that a copolymerization resin derived from specific three kinds of bisphenols and a mixture of said copolymerization resin and conventional bisphenol A type polycarbonate resin can be used as high quality optical materials with a remarkably reduced oblique incidence birefringence, excellent moldability, excellent transcription and good transparency, and accomplished the present invention.

That is, the present invention provides a polycarbonate resin obtained by reaction of a compound represented by the following general formula (A), a compound represented by the following general formula (B), a compound represented by the following general formula (C) and a carbonic acid ester-forming compound, wherein an amount of a compound represented by the general formula (A) is 30 to 80% by weight to total amount of a compound represented by the general formula (A) and a compound represented by the general formula (B) and a compound represented by the general formula (C) is 1 to 80% by weight to total amount of a compound represented by the general formula (A), a compound represented by the general formula (B) and a compound represented by the general formula (C) and an intrinsic viscosity of said polycarbonate resin is 0.2 to 1.0 dl/g;

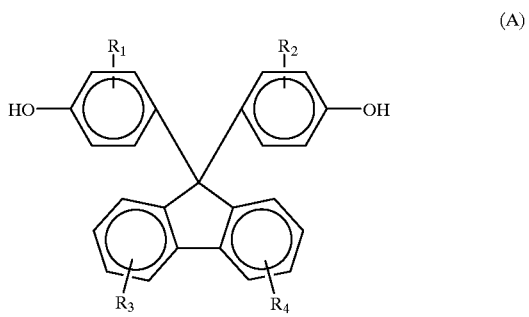

(A)

wherein $R_1$, $R_2$, $R_3$ and $R_4$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

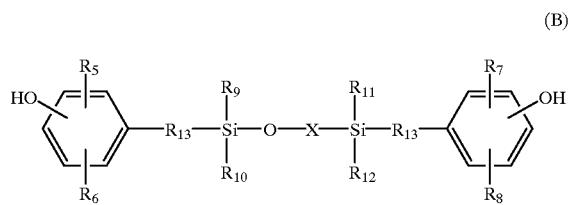

(B)

wherein $R_5$, $R_6$, $R_7$ and $R_8$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); $R_9$, $R_{10}$, $R_{11}$ and $R_{12}$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); $R_{13}$ is an aliphatic group having 1 to 6 carbon atoms or absent; X is —SiO($R_{14}$)($R_{15}$)—, —SiO($R_{16}$)($R_{17}$)—, a homopolymer of —SiO($R_{14}$)($R_{15}$)— or —SiO($R_{16}$)($R_{17}$)— having an average polymerization degree of more than 0 and 200 or below or a random copolymer of —SiO($R_{14}$)($R_{15}$)— and —SiO($R_{16}$)($R_{17}$)— having an average polymerization degree of more than 0 and 200 or below; $R_{14}$, $R_{15}$, $R_{16}$ and $R_{17}$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

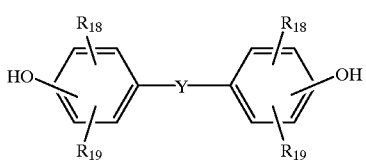

(C)

wherein $R_{18}$ and $R_{19}$ are, each independently, hydrogen, an alkyl group having 1 to 10 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);
Y is;

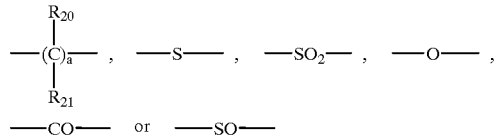

wherein $R_{20}$ and $R_{21}$ are, each independently, hydrogen, an alkyl group having 1 to 10 carbon atoms, an alkenyl group having 2 to 10 carbon atoms, an alkoxy group having 1 to 10 carbon atoms or an aryl group having 6 to 12 carbon atoms, or an aliphatic ring or a heterocycle in combination of $R_{20}$ and $R_{21}$ and when said group has carbon atom, said group can have an alkyl group having 1 to 5 carbon atoms, an alkenyl group having 2 to 5 carbon atoms or an alkoxy group having 1 to 5 carbon atoms as a substituent(s) and a is an integer of 0 to 20.

DETAILED DESCRIPTION OF THE INVENTION

The invention will be described in detail below.

Examples of the carbonic acid ester-forming compound include phosgene and bisaryl carbonates such as diphenyl carbonate, di-p-tolyl carbonate, phenyl-p-tolyl carbonate, di-p-chlorophenyl carbonate and dinaphthyl carbonate and a combination of two species of the compounds thereof or above.

The polycarbonate resin of the present invention can be produced by reaction of the compound represented by above-mentioned general formula (A) (hereinafter, "compound of formula (A)"), the compound represented by above-mentioned general formula (B) (hereinafter, "compound of formula (B)"), the compound represented by above-mentioned general formula (C) (hereinafter, "compound of formula (C)") and a carbonic acid ester-forming compound. Known processes for producing a polycarbonate resin to be derived from bisphenol A, e.g., a process comprising a direct reaction between bisphenols and phosgene (phosgene process) or a process comprising transesterification between bisphenol and a bisaryl carbonate (transesterification process) can be applied.

Among the phosgene process and the transesterification process, it is preferable to apply the phosgene process, considering reactivity between the compound of formula (A) and the compound of formula (B).

In the phosgene process, the reaction of the compound of formula (A), the compound of formula (B), the compound of formula (C) and phosgene is performed usually in the presence of an acid bonding agent and a solvent.

Examples of the acid bonding agent include pyridine and alkali metal hydroxides including sodium hydroxide and potassium hydroxide.

Examples of the solvent include methylene chloride, chloroform, chlorobenzene and xylene.

Further, in order to promote polycondensation, a catalyst including tertiary amines such as triethylamine is added. In order to adjust polymerization degree, monofunctional compounds including phenol, p-t-butyl phenol and p-cumyl phenol alkyl-substituted phenols, hydroxy benzoic acid alkyls, and alkyl oxy phenols are added as molecular weight modifier.

If necessary, a small amount of antioxidants including sodium sulfite and hydrosulfite and a small amount of branching agents including phloroglucine, isatin bisphenol, 1,1,1-tris(4-hydroxyphenyl) ethane and α,α',α"-tris(4-hydroxyphenyl)-1,3,5-triisopropyl benzene may be added.

The reaction temperature is usually in the range of 0 to 150° C. and preferably in the range of 5 to 40° C. The reaction time is usually 0.5 minutes to 10 hours and preferably 1 minute to 2 hours, depending on the reaction temperature. It is preferable to maintain pH of the reaction system to 10 or above during the reaction.

In the transesterification process, a mixture of the compound of formula (A), the compound of formula (B), the compound of formula (C) and bisaryl carbonate is reacted under a reduced pressure at a high temperature. In this reaction, a monofunctional compound(s) including p-t-butyl phenol, p-cumyl phenol alkyl-substituted phenols, hydroxy benzoic acid alkyls and alkyl oxy phenols may be added as molecular weight modifier.

The reaction is performed usually at a temperature of 150 to 350° C. and preferably 200 to 300° C. Phenols by-produced by transesterification and derived from bisaryl carbonate are distilled off preferably under a final reduced pressure degree of 1 mmHg or below outside the reaction system. The reaction time is usually about 1 to 10 hours, depending on the reaction temperature or the reduced pressure degree. It is preferable to perform the reaction under the atmosphere of an inert gas such as nitrogen, argon, etc. If necessary, an antioxidant(s) and a branching agent(s) may be added.

Examples of the compound of formula (A) include 9,9-bis(4-hydroxy-2-methylphenyl) fluorene, 9,9-bis(4-hydroxy-3-methylphenyl) fluorene, 9,9-bis(4-hydroxyphenyl) fluorene, 3,6-dimethyl-9,9-bis(4-hydroxyphenyl) fluorene, 9,9-bis(3-methoxy-4-hydroxyphenyl) fluorene, 9,9-bis(3-ethoxy-4-hydroxyphenyl) fluorene, 9,9-bis(3-ethyl-4-hydroxyphenyl) fluorene, 4,5-dimethyl-9,9-bis(4-hydroxyphenyl) fluorene, 9,9-bis(3-phenyl-4-hydroxyphenyl) fluorene, 3,6-dimethyl-9,9-bis(3-methyl-4-hydroxyphenyl) fluorene and 3,6- diphenyl-9,9-bis(4 -hydroxyphenyl)fluorene. Among them, 9,9-bis(4-hydroxyphenyl) fluorene, 9,9-bis(4-hydroxy-3-methylphenyl) fluorene and 9,9-bis(4-hydroxy-2-methylphenyl) fluorene are preferable. A combination of two species of the compounds thereof or above may be used.

Examples of the compound of the formula (B) include the compounds represented by the below structural formulas and a combination of two species of the compounds thereof or above.

methylphenyl) propane (dimethyl bisphenol A), 2,2-bis(4-hydroxy-3,5-dimethylphenyl) propane, 1,1-bis(4-hydroxyphenyl)-1-phenylethane(bisphenol AP;BPAP), bis (4-hydroxyphenyl) diphenylmethane, 2,2-bis(4-hydroxy-3-allylphenyl) propane and 3,3,5-trimethyl-1,1-bis(4-hydroxyphenyl) cyclohexane. A combination of two species of above-mentioned compounds or above may be used. Among them, particullarly, 2,2-bis(4-hydroxyphenyl) propane is preferable.

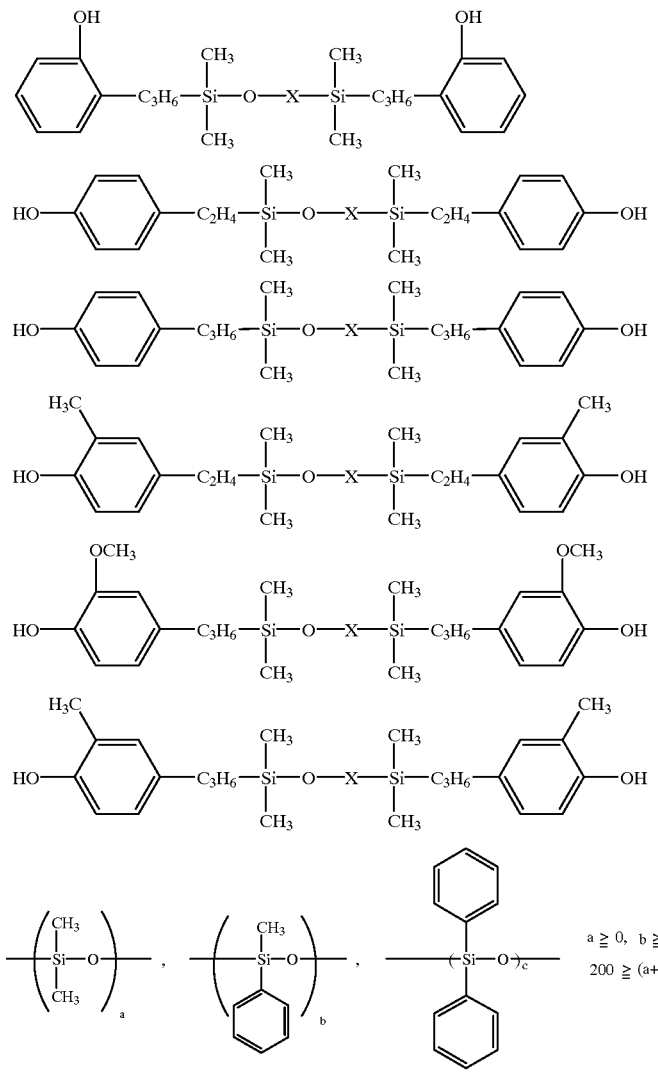

It is preferable that X contains 1 to 100 dimethylsiloxanes or 1 to 100 diphenylsiloxanes and is a random copolymer thereof. Among them, particularly, α,ω-bis[3-(o-hydroxyphenyl) propyl] polydimethyldiphenyl random copolymer siloxane and α,ω-bis[3-(o-hydroxyphenyl) propyl] polydimethylsiloxane are preferable.

Examples of the compound of formula (C) include 4,4'-biphenyl diol, bis(4-hydroxyphenyl) methane, bis(4-hydroxyphenyl) ether, bis(4-hydroxyphenyl) sulfone, bis(4-hydroxy-3-methylphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl) ethane, 2,2-bis(4-hydroxyphenyl) propane (bisphenol A;BPA), 2,2-bis(4-hydroxyphenyl) butane, 1,1-bis(4-hydroxyphenyl) cyclohexane (bisphenol Z;BPZ), 2,2-bis(4-hydroxy-3-

When the phosgene process is applied to the present invention, it is possible to inject phosgene in the presence of a tetraammonium salt in order to perform efficiently the reaction. Examples of tetraammonium salt include tetramethylammonium chloride, trimethylbenzylammonium chloride, triethylbenzylammonium chloride, tetraethylammonium bromide and tetra-n-butylammonium iodide, among which trimethylbenzylammonium chloride and triethylbenzylammonium chloride are preferable. It is preferable that the amount of tetraammonium salt is usually 0.0005 to 5 mol % to total amount of bisphenols to be used.

Further, when a molecular weight modifier is used in the present invention, monohydric phenol is preferable. Examples of the molecular weight modifier include phenol, alkyl-substituted phenols including butyl phenol, octyl phenol, nonyl phenol, decanyl phenol, tetradecanyl phenol, heptadecanyl phenol and octadecanyl phenol; alkyl hydroxy benzoates including butyl hydroxy benzoate, octyl hydroxy benzoate, nonyl hydroxy benzoate, decanyl hydroxy benzoate and heptadecanyl hydroxy benzoate; alkyl oxy phenols including butoxy phenol, octyl oxy phenol, nonyl oxy phenol, decanyl oxy phenol, tetradecanyl oxy phenol, heptadecanyl oxy phenol and octadecanyl oxy phenol. The amount of the molecular weight modifier is 0.1 to 50 mol % and preferably 0.5 to 10 mol % to total amount of bisphenols.

The polycarbonate resin thus synthesized can be molded by known molding methods including extrusion molding, injection molding, blow molding, compression molding and wet molding. It is preferable that the intrinsic viscosity [η] of the polycarbonate resin is in the range of 0.2 to 1.0 dl/g since it is desirable that it can be readily extrusion-molded or injection-molded as an optical material to mold an optical article. Particularly, when a high cycle molding is required, it is preferable that it is in the range of 0.2 to 0.6 dl/g.

It is preferable that the amount of the compound of formula (A) is 30 to 80% by weight to total amount of the compound of formula (A) and the compound of formula (B), considering curvature, strength and low birefringence of the mold article. When the amount of the compound of formula (A) is below 30% by weight, curvature of the disc molded article becomes large, whereas above 80% by weight strength is decreased and crack occurs during disc molding.

It is preferable that the amount of the compound of formula (C) is 1 to 80% by weight to total mount of the compound of formula (A), the compound of formula (B) and the compound of formula (C), considering a resin replacement in a molder, transparency and low birefringence of the molded article. When the amount of the compound of formula (C) is below 1% by weight, remarkable white turbidity occurs in a blend with a conventional bisphenol A type polycarbonate. Consequently, in case of production apparatus of other sorts to use the material in a molder in which a conventional bisphenol A type polycarbonate is usually used, necessity to disjoint and wash the apparatus occurs, so that operation efficiency of the apparatus is lowered and a return after cleaning of the apparatus is delayed. Furthermore, there are defects that it substantially becomes impossible to mix a conventional bisphenol A polycarbonate in order to reduce a production cost and a replaced article at the time of exchange to other sort becomes opaque, so that recycling use is limited. When the amount of formula (C) is above 80% by weight, the value of birefringence becomes insufficient.

When the polycarbonate resin of the present invention is extrusion molded or injection molded, too large or too small flowability causes problems in molding. It is preferable that the polycarbonate resin of the present invention for extrusion molding has the range of flow rate $1\times10^{-2}$ to $15\times10^{-2}$ cc/sec measured with a flow tester (nozzle diameter 1 mm, length 10 mm) at 280° C. under 160 kgf/cm². When the flow rate is outside the range of $1\times10^{-2}$ to $15\times10^{-2}$ cc/sec, a dimension precision of the molded article is deteriorated. Further, it is preferable that the polycarbonate resin of the present invention for injection molding has the range of flow rate $3\times10^{-2}$ to $90\times10^{-2}$ cc/sec measured by above-mentioned measuring flow tester and conditions. When the flow rate is below $3\times10^{-2}$ cc/sec, flowability is deteriorated, so that failure filling into a mold and a flow mark sometimes occur. When the flow rate is above $90\times10^{-2}$ cc/sec, failure releasing from a mold and curvature readily occur.

It is preferable that the molding temperature in extrusion molding and injection molding of the polycarbonate resin is, respectively, 230 to 320° C. and 240 to 380° C.

It is preferable that the polycarboante resin is highly purified in the same manner as in conventional polycarbonate for optical disc. In detail, it is purified so as to satisfy as much as possible criterions including dusts of diameter 50 μm or above: substantially undetected, dusts of diameter 0.5 to 50 μm: $3\times10^4$ or below, inorganic and organic residual chloride: 2 ppm or below, residual alkali metal: 2 ppm or below, residual hydroxyl group: 200 ppm or below, residual nitrogen content: 5 ppm or below and residual monomer: 20 ppm or below. Post treatments such as extraction for removal of low molecular weight substances and removal of a solvent are sometimes performed.

Regarding the compound of formula (A), the compound of formula (B), the compound of formula (C) and a carbonic ester-forming compound as raw materials, it is preferable to use materials reduced impurities and isomers as much as possible.

In the polycarbonate resin of the present invention, in order to ensure stability and mold releasing be required during extrusion molding or injection molding, if necessary, antioxidants such as hindered phenols and phosphites; lubricants and mold releasing agents including silicons, fatty acid esters, fatty acids, fatty acid glycerides and natural fats and oils including bees wax; light stabilizers such as benzotriazoles, benzophenones, dibenzoyl methane and salicylates and antistatic agents such as polyalkylene glycols and fatty acid glycerides may be used together with the polycarbonate resin.

Further, in order to reduce cost and recycle, a mixture of the polycarbonate resin with an ordinary polycarbonate resin(s) other than the polycarbonate resin may optionally be used within the range not to impair performances. Although the range not to impair performances is different depending on purposes to be used, in addition to above-mentioned properties as a molding material, it is preferable to satisfy at least one and preferably at least two conditions of a 30 degree oblique incidence light birefringence of below 110 nm, a photoelastic sensitivity of below $70\times10^{-22}$ m²/N and total light transmissivity of 80% or above of a molded article of thickness 3 mm.

PREFERRED EMBODIMENT OF THE INVENTION

The present invention will be described in more below, referring to Examples, which are not intended to limit the scope of the present invention.

Each properties were measured according to the following methods.

Birefringence

The measurement was performed for an injection molded optical disc substrate of a polycarbonate resin sample with auto-Ellipsometer, manufactured by k.k., Mizojiri Kogaku Kogyo, in Japan by a light of 30 degree oblique incidence angle and wave length 632.8 nm.

Photoelastic Sensitivity

A cast film of thickness 50 μm was prepared from a polycarbonate resin powder sample. The measurement was performed for the cast film with auto-Ellipsometer, manufactured by k.k., Mizojiri Kogaku Kogyo, in Japan under a load of 300 to 1100 g in a wave length of 632.8 nm.

Transcription

The measurement was performed for an injection molded optical disc substrate of a polycarbonate resin sample with an atomic force microscope NV2100, manufactured by Olympus Co.

Intrinsic Viscosity [η]

Intrinsic viscosity [η] [dl/g] was measured for a polycarbonate resin solution of 0.5 g/dl concentration in methylene chloride solvent at Huggins's constant of 0.45 at a temperature of 20° C.

Total Light Transmissivity and Haze

Total light transmissivity (%) and haze (%) were measured for an injection molded board article of a polycarbonate resin sample with HM-100, manufactured by Murakami Color Technology Research Laboratory in Japan by a transmission light of 1.9 mmφ.

Haze(H) is calculated as follows:

$$Tp = Tt - Td$$

$$H = (Td/Tt) \times 100$$

Tt: total light transmissivity
Tp: parallel light transmissivity
Td: diffusion light transmissivity

EXAMPLE 1

2.604 kg of 9,9-bis(4-hydroxy-3-methylphenyl) fluorene (hereinafter "BCFL"), 3.906 kg of a polyorganosiloxane random copolymer having the below structure of dimethylsiloxane and diphenylsiloxane having 3-(o-hydroxyphenyl) propyl group at α and ω positions and having average polymerization degree a=26 and C=13 (hereinafter, "Si"), 0.490 kg of 2,2-bis(4-hydroxyphenyl) propane (hereinafter, "BPA") and 20 g of sodium dithionite were dissolved in 49 L of 8.8 (w/v) sodium hydroxide aqueous solution. 36 L of methylene chloride was added thereto and then 1.462 kg of phosgene was injected at the rate of 0.12 kg/min while maintaining 15° C.

After the completion of injection, 66 g of p-t-butyl phenol (hereinafter, "PTBF") was added thereto and vigorous stirring was continued for 10 minutes. Then, 10 ml of triethylamine was added thereto and polymerization was performed for about one hour with stirring.

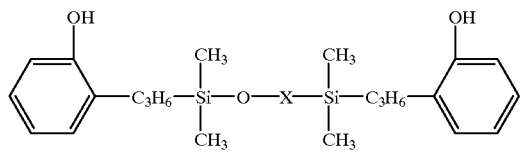

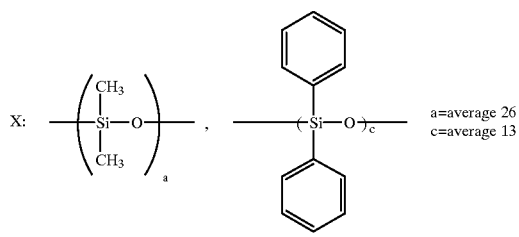

The polymer liquid was separated into an aqueous phase and an organic phase. The organic phase was neutralized with phosphoric acid. Water washing was repeated until an electrical conductivity of the washed liquid became 10 μS/cm or below, thus obtaining a purified resin liquid. The purified resin liquid thus obtained was slowly added in drop wise to hot water maintained to 60° C. under intense stirring, and the polymer was solidified while removing the solvent. The solid substance thus obtained was filtered and dried, whereby a white powdery polymer was obtained.

The intrinsic viscosity [η] of the polymer was 0.25 dl/g. The polymer was analyzed by infrared absorption spectrum. Absorption due to carbonyl group near 1770 cm$^{-1}$ and absorption due to ether bond near 1240 cm$^{-1}$ were detected. It was confirmed that the polymer had carbonate bond. Absorption due to hydroxyl group at the position of 3650 to 3200 cm$^{-1}$ was almost never detected. Monomers in the polymer were determined by GPC analysis. Each content of each monomer was 20 ppm or below.

Thus, it was confirmed that the polymer was a polycarbonate having the below structural units.

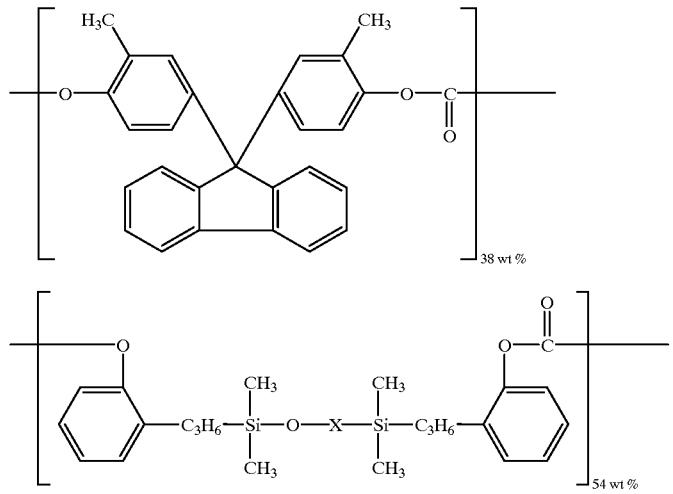

-continued

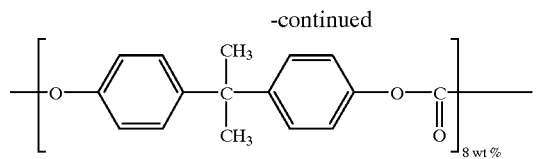

monomer ratio = 37:56:7 (weight %)

300 ppm of stearic acid monoglyceride was added to the polycarbonate powder thus obtained. Then, the mixture thus obtained was melt pelletized with a vent type biaxial extruder of 30 mm, equipped with a polymer filter of 10 μm at 300° C. A portion of the pellets thus obtained was injection molded with a disc molder, SD-4, manufactured by Sumitomo Jukikai Kogyo, k.k., in Japan at a resin temperature of 300° C. at a mold temperature of 100° C. in a molding cycle of 10 sec/plate, whereby an optical disc substrate of outer diameter 120 mm and thickness 1.2 mm was prepared. Further, a portion of the pellets thus obtained was injection molded with a molder, FS120S18ASE, manufactured by Nissei Jusi Kogyo k.k., in Japan at a resin temperature of 260° C. at a mold temperature of 100° C. in a molding cycle of 50 sec/plate, whereby a board article of thickness 3 mm was prepared. Each molded article was standing in a room for two days. Then, the 30 degree oblique incidence birefringence and transcription of the optical disc substrate and the total light transmissivity and haze of the board article were measured. A cast film of thickness 50 μm was prepared from the polycarboante powder. The photoelastic sensitivity of the cast film was measured. The results were shown in Tables 1 and 2.

EXAMPLE 2

The experiment was performed in the same manner as in Example 1 except that the amount of BCFL was changed to 3.906 kg; the amount of Si was changed to 2.604 kg; the amount of phosgene was changed to 1.933 kg and amount of PTBP was changed to 87.9 g.

The intrinsic viscosity [η] of the polymer thus obtained was 0.25 dl/g. It was confirmed that the polymer had a polycarbonate structure identical to that of Example 1 except the polymerization ratio of monomer by infrared absorption spectrum. The results of measurement of properties were shown in Tables 1 and 2.

EXAMPLE 3

The experiment was performed in the same manner as in Example 1 except that the amount of BCFL was changed to 5.208 kg; the amount of Si was changed to 1.302 kg; the amount of phosgene was changed to 2.405 kg and amount of PTBP was changed to 110 g.

The intrinsic viscosity [η] was 0.25 dl/g. It was confirmed that the polymer had a polycarbonate structure identical to that of Example 1 except the polymerization ratio of monomer. The results of measurement of properties were shown in Tables 1 and 2.

EXAMPLE 4

The polycarbonate powder was obtained in the same manner as in Example 1 except that the amount of BCFL was changed to 4.158 kg; the amount of Si was changed to 2.772 kg; the amount of BPA was changed to 0.070 kg; the amount of phosgene was changed to 1.780 kg and the amount of PTBP was changed to 80 g.

The intrinsic viscosity [η] of the polycarbonate powder thus obtained was 0.25 dl/g. It was confirmed that the polymer had a polycarbonate structure identical to that of Example 1 except the polymerization ratio of monomer by infrared absorption spectrum.

1 kg of polycarbonate powder thus obtained, 4 kg of conventional optical BPA type polycarbonate, H-4000, manufactured by Mitsubishi Gas Chemical Co., Inc., in Japan, having [η]=0.35 dl/g (hereinafter, "H-4000") and 1.5 g of stearic acid monoglyceride were mixed. The mixture thus obtained was extruded and melt pelletized with a vent type biaxial extruder of 30 mm, equipped with a polymer filter of 10 μm at 300° C. The intrinsic viscosity [η] of melt pellets of the mixture was 0.33 dl/g.

The pellets thus obtained were molded in the same manner as in Example 1 and evaluated. The results of measurement of properties were shown in Tables 1 and 2.

EXAMPLE 5

The polycarbonate powder was obtained in the same manner as in Example 1 except that the amount of BCFL was changed to 2.520 kg; the amount of Si was changed to 1.680 kg; the amount of BPA was changed to 2.800 kg; the amount of phosgene was changed to 2.865 kg and the amount of PTBP was changed to 223 g.

The intrinsic viscosity [η] of the polycarbonate powder was 0.25 dl/g. It was confirmed that the polymer had a polycarbonate structure identical to that of Example 1 except the polymerization ratio of monomer by infrared absorption spectrum.

1.65 kg of polycarbonate powder thus obtained, 3.35 kg of H-4000 and 1.5 g of stearic acid monoglyceride were mixed. The mixture thus obtained was extruded and melt pelletized with a vent type biaxial extruder of 30 mm, equipped with a polymer filter of 10 μm at 300° C.

The intrinsic viscosity [η] of melt pellets of the mixture was 0.32 dl/g. The pellets thus obtained were molded in the same manner as in Example 1 and evaluated. The results of measurement of properties were shown in Tables 1 and 2.

EXAMPLE 6

The polycarbonate powder was obtained in the same manner as in Example 1 except that the amount of BCFL was changed to 1.26 kg; the amount of Si was changed to 0.840 kg; the amount of BPA was changed to 4.900 kg; the amount of phosgene was changed to 3.216 kg and the amount of PTBP was changed to 388 g.

The intrinsic viscosity [η] of the polycarbonate powder was 0.25 dl/g. It was confirmed that the polymer had a polycarbonate structure identical to that of Example 1 except the polymerization ratio of monomer by infrared absorption spectrum.

3.35 kg of polycarbonate powder thus obtained, 1.65 kg of H-4000 and 1.5 g of stearic acid monoglyceride were mixed. The mixture thus obtained was extruded and melt pelletized with a vent type biaxial extruder of 30 mm, equipped with a polymer filter of 10 μm at 300° C.

The intrinsic viscosity [η] of melt pellets of the mixture was 0.28 dl/g. The pellets thus obtained were molded in the same manner as in Example 1 and evaluated. The results of measurement of properties were shown in Tables 1 and 2.

COMPARATIVE EXAMPLE 1

The molding and evaluation were performed in the same manner as in Example 1 except that H-4000 was used instead of the polycarbonate of Example 1. The results of measurement of properties were shown in Tables 1 and 2.

COMPARATIVE EXAMPLE 2

The experiment was performed in the same manner as in Example 1 except that the amount of BCFL was changed to 1.823 kg; the amount of Si was changed to 4.687 kg; the amount of phosgene was changed to 1.226 kg and the amount of PTBP was changed to 56 g.

The intrinsic viscosity [η] of the polymer thus obtained was 0.24 dl/g. It was confirmed that the polymer had a polycarbonate structure identical to that of Example 1 except the polymerization ratio of monomer by infrared absorption spectrum. The results of measurement of properties shown in Tables 1 and 2.

COMPARATIVE EXAMPLE 3

The experiment was performed in the same manner as in Example 1 except that the amount of BCFL was changed to 5.859 kg; the amount of Si was changed to 0.651 kg; the amount of phosgene was changed to 2.640 kg and the amount of PTBP was changed to 120.0 g.

The intrinsic viscosity [η] was 0.24 dl/g. It was confirmed that the polymer had a polycarbonate structure identical to that of Example 1 except the polymerization ratio of monomer. The results of measurement of properties were shown in Tables 1 and 2.

COMPARATIVE EXAMPLE 4

The polycarbonate powder was obtained in the same manner as in Example 1 except that the amount of BCFL was changed to 4.200 kg; the amount of Si was changed to 2.800 kg; the amount of BPA was changed to 0 kg; the amount of phosgene was changed to 1.735 kg and the amount of PTBP was changed to 79 g.

The intrinsic viscosity [η] of the polycarbonate powder was 0.25 dl/g. It was confirmed that the polymer had a polycarbonate structure identical to that of Example 1 except the polymerization ratio of monomer by infrared absorption spectrum.

1 kg of polycarbonate powder thus obtained, 4 kg of H-4000 and 1.5 g of stearic acid monoglyceride were mixed. The mixture thus obtained was extruded and melt pelletized with a vent type biaxial extruder of 30 mm, equipped with a polymer filter of 10 μm at 300° C.

The intrinsic viscosity [η] of melt pellets of the mixture was 0.33 dl/g.

The pellets thus obtained were molded in the same manner as in Example 1 and evaluated. The results of measurement of properties were shown in Tables 1 and 2.

COMPARATIVE EXAMPLE 5

The polycarbonate powder was obtained in the same manner as in Example 1 except that the amount of BCFL was changed to 0.420 kg; the amount of Si was changed to 0.280 kg; the amount of BPA was changed to 6.300 kg; the amount of phosgene was changed to 3.421 kg and the amount of PTBP was changed to 475 g.

The intrinsic viscosity [η] of the polycarbonate powder was 0.25 dl/g. It was confirmed that the polymer had a polycarbonate structure identical to that of Example 1 except the polymerization ratio of monomer by infrared absorption spectrum. The results of measurement of properties were shown in Tables 1 and 2.

According to the present invention, a polycarbonate resin with a remarkably reduced oblique incidence birefringence, excellent moldability, excellent transcription and good transparency can be provided. The polycarbonate resin is suitable to the production of optical articles such as optical discs including compact disc, laser disc, optical card, MO disc, digital versatile disc and near field recording disc, optical lenses including pick-up lens, spectacle lens and camera lens, optical films and optical sheets including cover layer for near field recording medium and optical filter, optical information transmission media including optical fiber and optical waveguide and photoconductive boards in which low birefringence is required.

TABLE 1

| Example & Comparative Example | (A) Copolymerization proportion*1 (wt %) | (C) Copolymerization proportion*2 (wt %) | H-4000 mixed amount*3 (wt %) | Oblique incidence birefringence (nm) Distance from center | | | Photoelastic sensitivity (×10$^{-22}$ m$^2$/N) |
|---|---|---|---|---|---|---|---|
| | | | | R = 24 mm | R = 42 mm | R = 56 mm | |
| Example | | | | | | | |
| 1 | 40 | 7 | 0 | 10 | 8 | 20 | 33 |
| 2 | 60 | 7 | 0 | 8 | 10 | 15 | 30 |
| 3 | 80 | 7 | 0 | 10 | 12 | 18 | 28 |
| 4 | 60 | 1 | 80 | 98 | 95 | 100 | 65 |
| 5 | 60 | 40 | 67 | 80 | 90 | 103 | 66 |
| 6 | 60 | 70 | 33 | 90 | 80 | 105 | 63 |
| Comp. Ex. | | | | | | | |
| 1 | 0 | 0 | 100 | 125 | 130 | 120 | 77 |
| 2 | 28 | 7 | 0 | — | — | — | 30 |
| 3 | 90 | 7 | 0 | — | — | — | 32 |
| 4 | 60 | 0 | 80 | — | — | — | — |
| 5 | 60 | 90 | 0 | 120 | 130 | 120 | 74 |

TABLE 1-continued

| Example & Comparative Example | (A) Copolymerization proportion*1 (wt %) | (C) Copolymerization proportion*2 (wt %) | H-4000 mixed amount*3 (wt %) | Oblique incidence birefringence (nm) Distance from center | | | Photoelastic sensitivity |
|---|---|---|---|---|---|---|---|
| | | | | R = 24 mm | R = 42 mm | R = 56 mm | ($\times 10^{-22}$ m$^2$/N) |

Note
(A) polymerization: weight percentage of amount of the compound of formula (A) to proportion total amount of the compound of formula (A) and the compound (B).
(C) polymerization: weight percentage of amount of the compound of formula (C) to proportion total amount of the compound of formula (A), the compound of formula (B) and the compound of formula (C).
H-4000 mixed amount: weight percentage of amount of mixed H-4000 to total amount of polycabonate powder obtained in each Example and conventional bisphenol A type polycarbonate resin for optics, H-4000 (wt %).

TABLE 2

| Example & Comparative Example | Transcription (%) | Intrinsic viscosity (dl/g) | Light total transmissivity (%) | haze (%) | Appearance |
|---|---|---|---|---|---|
| Example 1 | 99 | 0.25 | 91.5 | 0.6 | good |
| 2 | 98 | 0.25 | 89.2 | 0.8 | good |
| 3 | 90 | 0.25 | 89 | 0.8 | good |
| 4 | 99 | 0.33 | 85 | 4 | good |
| 5 | 98 | 0.32 | 85.1 | 3.9 | good |
| 6 | 98 | 0.28 | 85.3 | 3.8 | good |
| Comp. Ex. 1 | 98 | 0.35 | 91.7 | 0.6 | good |
| 2 | 99 | 0.24 | 91.5 | 0.6 | curvature |
| 3 | 80 | 0.24 | 89 | 0.8 | crack |
| 4 | — | 0.33 | 70 | 80 | white trubidity |
| 5 | 98 | 0.25 | 91.5 | 0.7 | good |

What is claimed is:

1. A polycarbonate resin produced by reaction of a compound represented by the following general formula (A), a compound represented by the following general formula (B), a compound represented by the following general formula (C) and a carbonic acid ester-forming compound, wherein an amount of a compound represented by the general formula (A) is 30 to 80% by weight to total amount of a compound represented by the general formula (A) and a compound represented by the general formula (B), and a compound represented by the general formula (C) is 1 to 80% by weight to total amount of a compound represented by the general formula (A), a compound represented by the general formula (B) and a compound represented by the general formula (C), and an intrinsic viscosity of said polycarbonate resin is 0.2 to 1.0 dl/g;

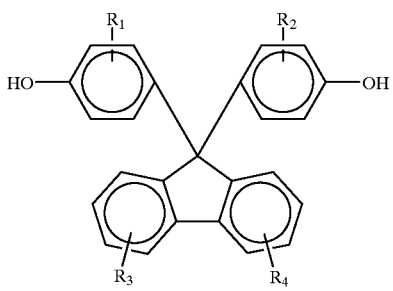

(A)

wherein $R_1$, $R_2$, $R_3$ and $R_4$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

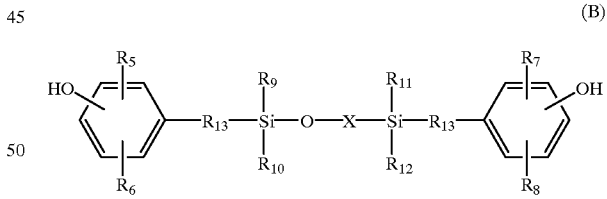

(B)

wherein $R_5$, $R_6$, $R_7$ and $R_8$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s) $R_9$, $R_{10}$, $R_{11}$ and $R_{12}$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s); $R_{13}$ is an aliphatic group having 1 to 6 carbon atoms or absent; X is —$SiO(R_{14})(R_{15})$—, —$SiO(R_{16})(R_{17})$—, a homopolymer of —$SiO(R_{14})(R_{15})$— or —$SiO(R_{16})(R_{17})$— having an average polymerization degree of more than 0 and 200 or below or a random copolymer of —$SiO(R_{14})(R_{15})$— and —$SiO(R_{16})(R_{17})$— having an average polymerization degree of more than 0 and 200 or below; $R_{14}$, $R_{15}$, $R_{16}$ and $R_{17}$ are, each independently, hydrogen, an alkyl group having 1 to 5 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

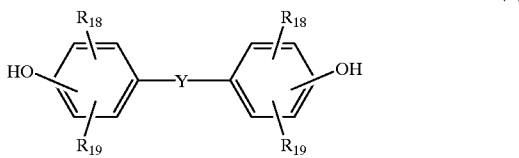

(C)

wherein $R_{18}$ and $R_{19}$ are, each independently, hydrogen, an alkyl group having 1 to 10 carbon atoms, an aryl group having 6 to 12 carbon atoms, an alkenyl group having 2 to 5 carbon atoms, an alkoxy group having 1 to 5 carbon atoms, an aralkyl group having 7 to 17 carbon atoms and when said group has carbon atom, said group can have an alkyl group having 1 to 5 carbon atoms, an alkenyl group having 2 to 5 carbon atoms or an alkoxy group having 1 to 5 carbon atoms as a substituent(s);

Y is;

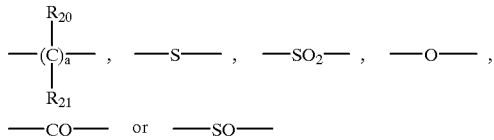

wherein $R_{20}$ and $R_{21}$ are, each independently, hydrogen, an alkyl group having 1 to 10 carbon atoms, an alkenyl group having 2 to 10 carbon atoms, an alkoxy group having 1 to 10 carbon atoms or an aryl group having 6 to 12 carbon atoms, or an aliphatic ring or a heterocycle in combination of $R_{20}$ and $R_{21}$ and when said group has carbon atom, said group can have an alkyl group having 1 to 5 carbon atoms, an alkenyl group having 2 to 5 carbon atoms or an alkoxy group having 1 to 5 carbon atoms as a substituent(s) and a is an integer of 0 to 20, wherein said intrinsic viscosity is measured for the polycarbonate resin in a methylene chloride solution of 0.5 g/dl at 20° C.

2. A polycarbonate resin according to claim 1, wherein said compound represented by the general formula (A) is at least one selected from the group consisting of 9,9-bis(4-hydroxyphenyl) fluorene, 9,9-bis(4-hydroxy-3-methylphenyl) fluorene and 9,9-bis(4-hydroxy-2-methylphenyl) fluorene.

3. A polycarbonate resin according to claim 1, wherein said carbonic acid ester-forming compound is phosgene.

4. A polycarbonate resin according to claim 1, wherein each said $R_9$, $R_{10}$, $R_{11}$ and $R_{12}$ in the compound represented by the general formula (B) are at least one group selected from the group consisting of methyl group and phenyl group.

5. A polycarbonate resin according to claim 1, wherein said compound represented by the general formula (B) is at least one compound selected from the group consisting of a random copolymer of dimethylsiloxane and diphenylsiloxane having 3-(o-hydroxyphenyl)propyl group at α,ω positions and α,ω-bis[3-(o-hydroxyphenyl) propyl] polydimethylsiloxane.

6. A polycarbonate resin according to claim 1, wherein said compound represented by the general formula (C) is 2,2-bis(4-hydroxyphenyl)propane.

7. A polycarbonate resin composition comprising of a mixture of the polycarbonate resin described in claim 1 and a polycarbonate resin derived from 2,2-bis(4-hydroxyphenyl)propane.

8. An optical article used the polycarbonate resin in described in claim 1, having a 30 degree oblique incidence birefringence of below 110 nm.

9. An optical article used the polycarbonate resin in described in claim 7, having a 30 degree oblique incidence birefringence of below 110 nm.

10. An optical article used the polycarbonate resin in described in claim 1, having a photoelastic sensitivity of below $70 \times 10^{-22}$ m$^2$/N.

11. An optical article used the polycarbonate resin in described in claim 7, having a photoelastic sensitivity of below $70 \times 10^{-22}$ m$^2$/N.

12. An optical article used the polycarbonate resin in described in claim 1, having a total light transmissivity of 80% or above in a molded article of 3 mm.

13. An optical article used the polycarbonate resin in described in claim 7, having a total light transmissivity of 80% or above in a molded article of 3 mm.

* * * * *